United States Patent [19]
Ollila

[11] Patent Number: 5,671,730
[45] Date of Patent: Sep. 30, 1997

[54] GAS MASK WITH ELECTRONIC BLOWER CONTROL

[75] Inventor: Rauno Ollila, Vaasa, Finland

[73] Assignee: Kemira Safety Oy, Vaasa, Finland

[21] Appl. No.: 393,749

[22] Filed: Feb. 24, 1995

[30] Foreign Application Priority Data

Feb. 25, 1994 [FI] Finland ................................. 940894

[51] Int. Cl.⁶ ............................................ A61M 16/00
[52] U.S. Cl. ........................ 128/204.21; 128/202.22; 128/205.27; 604/146; 73/168
[58] Field of Search ................ 128/200.24, 204.18, 128/204.21, 202.22, 205.27, 205.29; 318/139; 415/15, 912, 118, 232; 73/168; 604/146; 406/96; 454/239, 370, 238

[56] References Cited

U.S. PATENT DOCUMENTS

| | | | |
|---|---|---|---|
| 4,638,233 | 1/1987 | Erdman | 73/168 X |
| 4,905,687 | 3/1990 | Ponkala | 128/204.21 |
| 5,039,924 | 8/1991 | Avitan | 318/139 |
| 5,090,303 | 2/1992 | Ahmed | 454/239 X |
| 5,385,505 | 1/1995 | Sharp et al. | 454/238 |

FOREIGN PATENT DOCUMENTS

| | | |
|---|---|---|
| 0 164 946 A2 | 12/1985 | European Pat. Off. . |
| 0 094 757 B1 | 7/1987 | European Pat. Off. . |
| 0 334 555 A3 | 9/1989 | European Pat. Off. . |
| 0 621 056 A1 | 10/1994 | European Pat. Off. . |
| 38 09 405 A1 | 10/1989 | Germany . |
| 2 032 284 | 5/1980 | United Kingdom . |
| 2 228 418 | 8/1990 | United Kingdom . |
| 2 235 136 | 2/1991 | United Kingdom . |

*Primary Examiner*—Vincent Millin
*Assistant Examiner*—Eric P. Raciti
*Attorney, Agent, or Firm*—Pennie & Edmonds

[57] ABSTRACT

The invention relates to a method for regulating the rate of air fed into a gas mask, as well as to a gas mask. The power of the gas mask blower is regulated on the basis of the current and rotation speed of the blower. The invention can be applied in any facial parts of breathing masks.

16 Claims, 2 Drawing Sheets

GAS MASK WITH ELECTRONIC BLOWER CONTROL

FIELD OF THE INVENTION

The invention relates to a method of regulating the rate of air fed into a gas mask, and to a gas mask. The invention can be applied in any facial parts of breathing masks.

BACKGROUND OF THE INVENTION

State-of-the-art gas masks are described, for example, in patent applications EP-94757 and FI-852272. Prior known gas masks involve problems of the wear of the motor-driving batteries and the risk that the batteries will deep discharge, whereby their useful life is shortened. Patent application EP-94757 discloses a method of limiting the consumption of power.

Patent application GB-2 032 284 discloses a known method of controlling the rotation speed of a mask blower on the basis of a pressure difference detected by a detector. Such a pressure difference detector is, however, susceptible to disturbance, and caution must be observed with respect to it when, for example, cleaning the mask.

Prior known devices involve the problem that the rate of air fed into the gas mask varies according to the degree to which the filter is clogged. When the filter is new and clean, more air passes through it than is required according to the standards in a given case. The disadvantages resulting from this include an excessive wear of the batteries and an excessive air flow, which may cause to the wearer headache and stinging of the eyes. Furthermore, when the filter becomes clogged there is the problem that it is not known when the flow of air fed into the gas mask falls below the required rate. On the other hand, an excessive rate of air leads to a more rapid clogging of the filter.

From patent publication FI-80606 there is known an arrangement for using the blower motor as a detector so that the electronic control circuit measures the current taken by the blower motor and the voltage effective at its poles. The arrangement exploits the centrifugal-blower property that the rate of air flowing through the blower per time unit is proportional to the torque of the rotor and, respectively, the pressure difference is proportional to the rotation speed.

On the basis of the voltage data, a pulse-width modulator is controlled so as to bring the current through the motor to a value at which the desired air flow is achieved. In this manner a constant air flow is obtained which is substantially independent of the structural resistance of the filters used, their degree of clogging, and the resistance caused by the facial part.

The changes in motor parameters are divided into two categories: bearing changes and commutator changes. It is typical of the motor parameter changes that, especially in sintered bearings, lubrication gradually weakens and the friction coefficient increases. For this reason a portion of the torque of the motor belongs to the bearing friction and is no longer effective in the blower rotor. In the commutator, on the other hand, the conductive deposition that results from fine dust coming off the structural materials creates a current path between segments, whereupon the generated short-circuit current will lower the moment obtained from the motor. After these changes have occurred, the electronics of the blower can in no way correct their effect, since in the physical sense the data containing the calibration of the device has been lost together with the motor parameters.

The disadvantages of the method disclosed in patent publication FI-80606 originally arise from the fact that the current of the motor is regulated by controlling the voltage effective across it. Since this voltage is at the same time the output quantity of the control system, the system becomes very sensitive to changes in the properties of the motor. The system is so sensitive in this respect that its successful construction has been possible only by using as the motor an iron-free permanent-magnet motor with noble metal brushes; such motors are also used as tachometers. The motors which are available commercially have not, however, been made in accordance with the claims of patent publication FI-80606.

SUMMARY OF THE INVENTION

An object of the present invention is to provide such a method of regulating the rate of air fed into a gas mask that the problems described above can be solved. To achieve this, the invention is characterized in that the blower power is regulated on the basis of the current and rotation speed of the blower.

The invention relates to a method by which the rate of air fed into a gas mask is maintained substantially constant by using the blower motor and the blower itself as a detector by means of which its power is regulated. A gas mask according to the invention incorporates a filter, a blower which promotes the feed of air passing through the filter, a motor which drives the blower, an electronic circuit which controls the operation, an arrangement for communicating the rotation speed data of the blower blade to the said circuit, and any necessary operating switches and function indicators.

The electronic control circuit according to the invention maintains the air rate constant by regulating the pulse-width ratio of the voltage effective across the motor. A light-emitting diode connected with the control circuit indicates when the blower motor is not capable of producing the selected air rate. To prevent deep discharge of the battery, a guard circuit cuts off the current to the device when the feed voltage falls below the limit value set.

In a gas mask according to the invention it is further possible to use as peripheral components calibration orifice plates and a device for external measuring of the rotation speed of the blower blade and/or an electronic device for transferring the parameter data to the control circuit.

In a permanent-magnet motor the torque is proportional to the current and the rotation speed is proportional to the voltage, which is obtained from the formula:

$$U_k = E + (I*R),$$

where $U_k$ is the pole voltage

E is the generator voltage, i.e. source voltage, corresponding to the rotation speed of the motor I is the motor current and R is the winding resistance.

In the system according to the invention, the effect of the brush voltage has been intentionally disregarded, since it is in any case necessary to use a motor type in which the brush voltage will remain insignificant, i.e. most preferably a motor with a noble metal brush. Furthermore, in an actual operating situation the winding resistance of the motor is dependent on the temperature; this also lowers precision of the control.

The blower and the motor together constitute an entity in which a suitably set current/voltage curve provides a constant flow as long as the motor parameters remain unchanged. This also applies to a blower, but in applications such as this the blower is in general not subject to mechanical stress, and not even to dirt, so that its properties will long remain stable.

In the system according to the invention, the rotation speed data of the blower is exploited directly by measuring the rotation speed and by determining the motor current on the basis of the rotation speed. In this case the ratio of the rotation speed of the blower to the pole voltage of the motor becomes substantially insignificant, and thus do also the disturbance factors associated with it, such as the current dependency due to the winding resistance and its temperature coefficient and possible brush voltage. Thus also graphite brushes are possible even at low voltages.

Another consequence of the direct exploitation of the rotation speed data of the blower is that the calibration data of the blower device are no longer necessarily tied to the properties of the motor but only to the properties of the blower. This is made possible by measuring at the manufacturing stage the blower rotation speed at which the blower provides the desired flow with a certain orifice plate. If this rotation speed data and the corresponding orifice plate or plates are available, the device can be retro-calibrated, i.e. changes in the motor parameters can be compensated for.

In the system according to the invention, the calibration of the control device is carried out by using a rotation speed meter and calibration orifice plates in such a manner that the current curve of the control device is adjusted so that the rotation speed of the blower settles at a value which corresponds to the correct flow with the orifice plates concerned. The rotation speed data is blower-specific and is determined by flow meter measurement by the manufacturer.

In the system according to the invention the control device may also calibrate itself when the calibration orifice plates are attached to the blower and the control device is set (for example by the wearer) to the calibration mode. In this case the control device will bring the blower to the rotation speed which corresponds to the correct flow for the blower in question. The rotation speed data is in the control device itself, and it is set therein in connection with manufacture or maintenance, i.e. when the blower box and the motor are connected to the control device.

BRIEF DESCRIPTION OF THE DRAWINGS

The system according to the invention is described below in detail, with reference to the accompanying figures, in which.

DETAILED DESCRIPTION OF THE DRAWINGS

Figure 1:
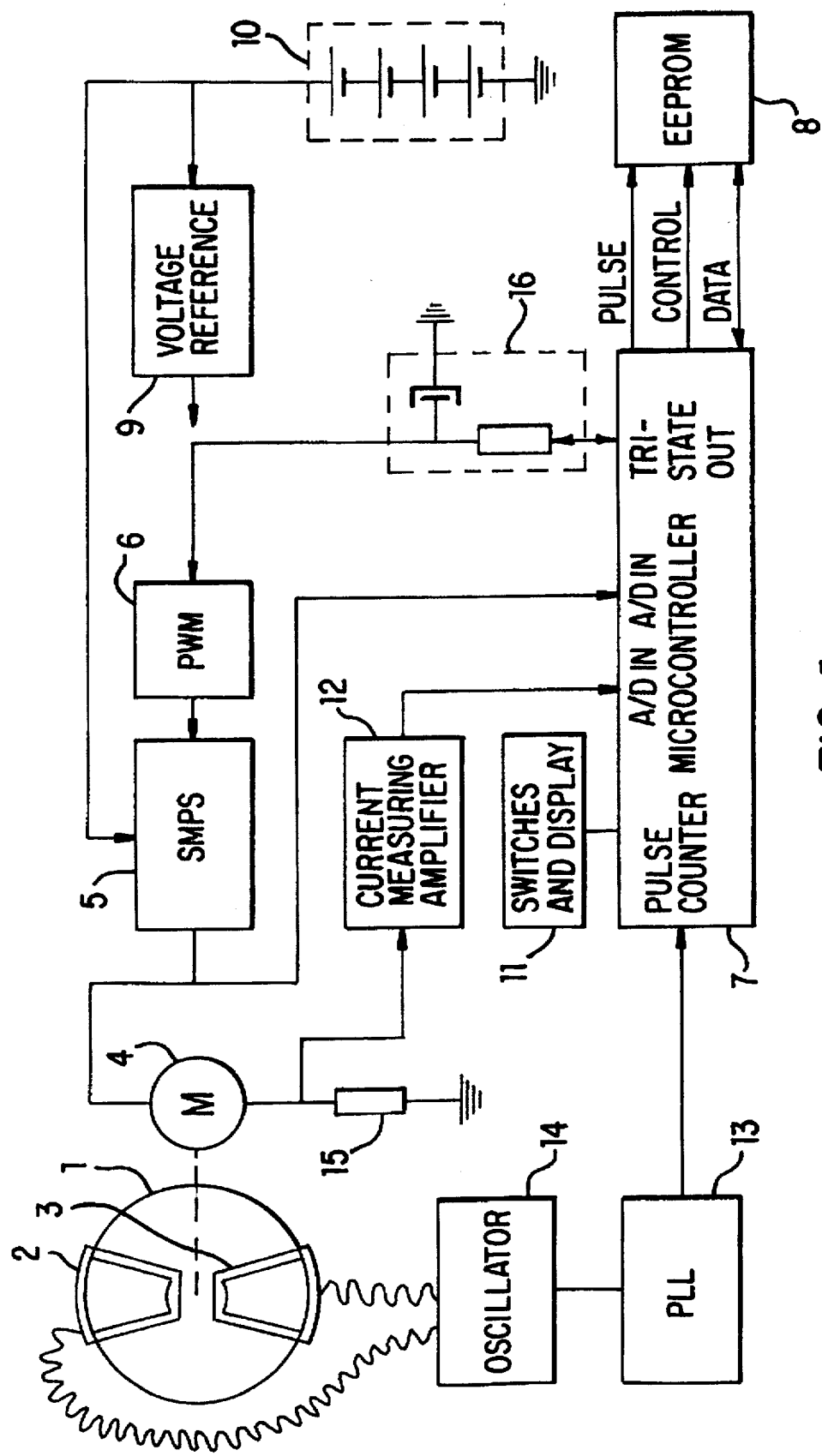
FIG. 1 depicts the control circuitry, with digital implementation, of the blower of a gas mask according to the invention.

FIG. 1 depicts the control circuitry, with digital signal processing, of the blower of a gas mask according to the invention. The control circuitry according to the invention comprises a blower rotor 1, blower capacitance electrodes 2, 3, a blower motor 4, a switched-mode power source 5, a pulse-width modulator 6, a microcontroller 7, a nonvolatile memory 8, a voltage reference 9, batteries 10, a switch and display block 11, a current-measuring amplifier 12, a phase-locked loop 13, an oscillator 14, a current-measuring shunt 15, and a control signal floating block 16 which serves as a signal storage filter to which a tri-state output is applied from the micro-controller.

The capacitance electrodes 2, 3 of the blower according to the invention are coupled to the blower rotor 1 so that they provide information regarding the speed of rotation of the blower via the oscillator 14 and the phase-locked loop 13 to the counter of the microcontroller 7. The current of the motor 4 is measured and is applied via the current-measuring amplifier 12 to the A/D converter of the microcontroller. On the basis of the current and rotation speed of the blower the microcontroller 7 calculates a suitable current value for the motor 4 and gives a suitable control signal to the switched-mode power source 5 via the control signal floating block 16 and the pulse-width modulator 6. The switched-mode power source 5 takes power from the batteries 10, controls the feed of current to the motor, and provides motor 4 control data also to the A/D converter of the microcontroller 7. A nonvolatile memory 8 is coupled to the microcontroller. The control circuitry also comprises a voltage reference 9 for the batteries 10, a microcontroller 7 switching and display block 11, and a motor 4 current-measuring shunt 15.

In a digital implementation of the system according to the invention, the rotation speed data, which itself is already digital, i.e. in pulse form, is not converted to analog form but is processed digitally. In the invention a microcontroller 7 is used to which a nonvolatile read-only memory 8 is coupled, the function of the memory being to store the said rotation speed data which contains calibration.

The control is effected by applying the rotation speed pulses to the controller counter which is read through software at suitable time intervals, and the rotation speed is obtained therefrom. By using this as the initial data the controller calculates a suitable current value for the motor. The setting of the current value may be carried out, for example, by means of a D/A converter through the control of a suitable analog circuit or by measuring the motor current by means of an A/D converter and by bringing the current control component towards the correct value by means of an output coupling.

Figure 2:
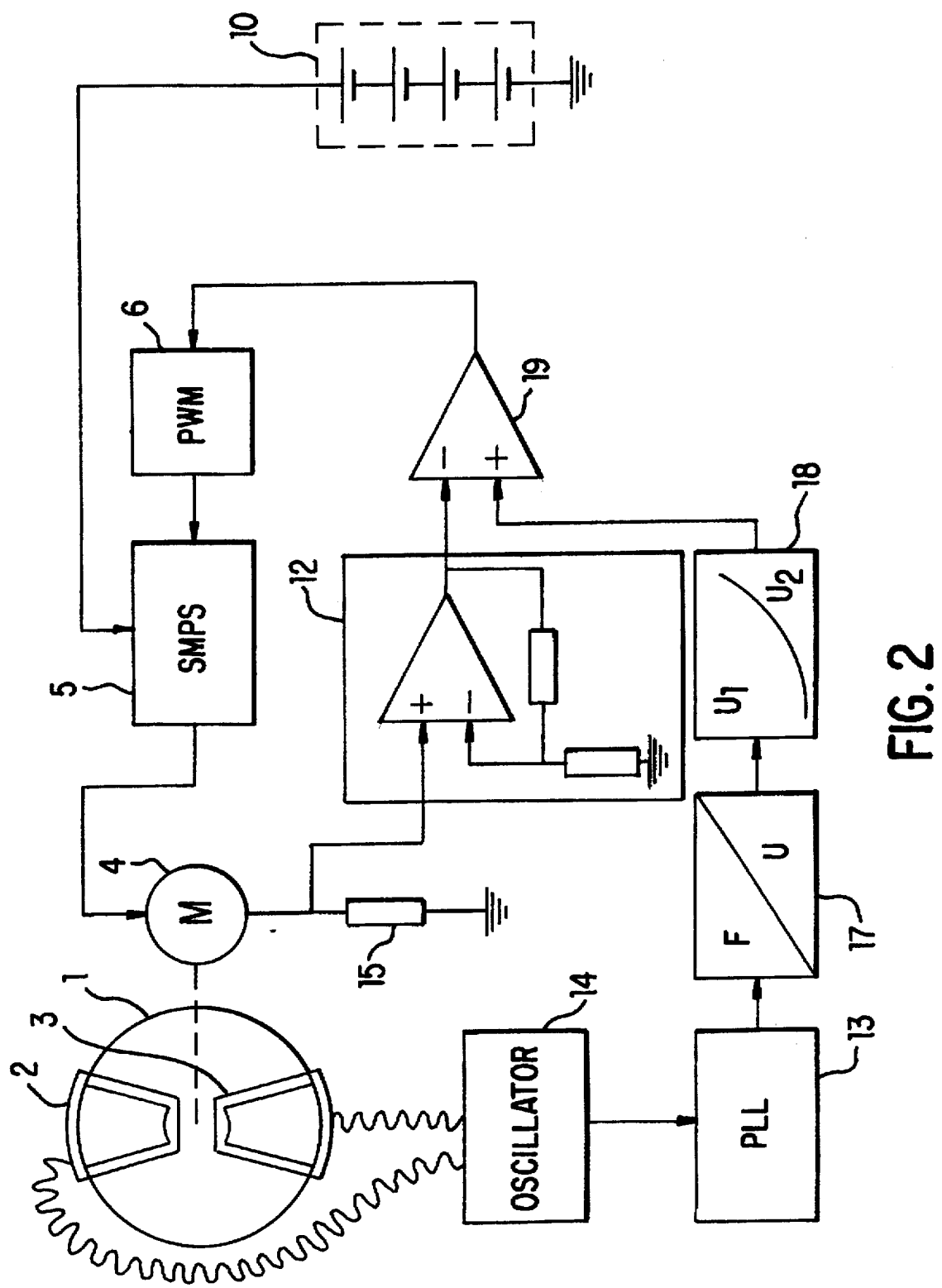
FIG. 2 depicts an analog implementation of the circuitry.

FIG. 2 depicts the control circuitry of a blower in a gas mask according to the invention, in which circuitry the signals are processed only in analog form. The control circuitry according to the invention comprises a blower rotor 1, blower capacitance electrodes 2, 3, a blower motor 4, a switched-mode power source 5, a pulse-width modulator 6, batteries 10, a current-measuring amplifier 12, a phase-locked loop 13, an oscillator 14, a current-measuring shunt 15, a frequency voltage converter 17, a compensation circuit 18, and a differential amplifier 19.

In the circuitry according to the invention, the capacitance electrodes 2, 3 are coupled to the blower rotor 1, in which case the capacitance fluctuation of the capacitance electrodes 3 causes the frequency of the oscillator 14 to fluctuate and the phase-locked loop 13 serves as a frequency fluctuation detector. The rotation speed pulses obtained from the phase-locked loop 13 are applied to the frequency voltage converter 17, from which a voltage E proportional to the speed of rotation is obtained, the voltage E being the generator voltage, i.e. the source voltage (without any deviation caused by the winding current or non-ideal properties of the commutator, but scaled by the frequency voltage converter) appearing in the pole voltage formula of the motor described above, corresponding to the rotation speed of the motor. The voltage obtained from the frequency voltage converter is applied to the compensation circuit 18, where the non-ideal properties of the blower are compensated for in a manner similar to that in Finnish patent publication 80606. The current of the motor 4 is measured and is applied via the current-measuring amplifier 12 to the differential amplifier 19, in which the outputs of the compensation circuit 18 and the current-measuring amplifier 12 are combined to generate the motor control current via the pulse-width modulator 6 and the switched-mode power source 5.

The structures described above have the quite special property that the speed of rotation can be easily measured from outside the device. This property is necessary in the analog structure. In it the retro-calibration of the device, without a current measuring device, is carried out by attaching a calibration orifice plate or orifice plates to the device, and by adjusting the rotation speed to correspond to the value determined by the manufacturer by using a current-measuring apparatus. The special advantage of capacitive measuring of the rotation speed lies in that the field of the measuring oscillator is available, even without a special arrangement, for the needs of external measuring of the rotation speed.

One preferred structural form is one in which the rotation speed meter comprises antenna plates, most preferably plates complying in shape with the oscillator measuring plates, which are placed against the outer shells of the blower device, and a circuit which uses a phase-locked loop coupled to these and converts frequency deviations to pulses, which circuit may be similar to the conventional frequency counter circuit in a telephone apparatus. In practice, the only prerequisite for external measuring is that the shells of the device must not be, for example, sealed metal shells which provide too complete a shield against electric fields.

In the digital implementation the retro-calibration may be taken even further, in which case there is no need even for a separate rotation speed meter or other tool, or for a professional; it is most preferably carried out by the wearer. This is carried out so that the wearer of the device replaces the filter/filters with the calibration orifice plate/plates delivered together with the device and initiates self-calibration. Since the device has in its memory the rotation speed data from one or several operating points with the above orifice plates, the microcontroller only needs to bring the blower to this rotation speed or to these rotation speeds and to measure the corresponding motor currents. In self-calibration the old current values are now replaced with these, and the microcontroller stores them in its nonvolatile memory.

In this connection the microcontroller may also advantageously monitor these current values and especially their stability, to draw conclusions regarding the condition of the blower unit and to give a warning of an approaching need for replacement, and may even refuse to operate unless the blower unit is replaced, or change its operating principle into "dummy mode", in which it does no active control but only sets the motor voltage into a factory-set constant value, if the blower unit is in so poor a condition that operation according to the principle of compensation for flow resistance is endangered.

In the analog implementation of the system according to the invention, the rotation speed data is converted to voltage data, and the motor current is set on the basis thereof. In addition, information can be obtained regarding the rotation of the blower by forming, by means of transducer-type devices, a rotation-speed pulse depicting the rotation of the blower. The number of pulses is affected not only by the rotation speed but also by the number of the devices so that from one rotation there may be obtained, for example, one pulse if the number of the devices is one, or two pulses if the number of the devices is two. There exist several devices for the forming of rotation speed pulses, some examples being a photo-optical fork or reflection transducer, a magnetic or Hall transducer, a pulse coil, and a capacitive transducer.

In a capacitive transducer, a conductive strip, most preferably a sticker or printing, is located on the blower blade, and in the blower box there are corresponding strips coupled as part of the oscillator circuit. The oscillator circuit for its part is coupled to a phase-locked loop which serves as a frequency deviation detector. In this manner a rotation-speed transducer is formed which is mechanically simple and inexpensive to manufacture, not sensitive to dirt, and does not require a through-put to the blower box and will thus not cause a sealing problem.

The system according to the invention may also be used in other breathing masks and their facial parts.

I claim:

1. A gas mask, comprising:
    a filter;
    a blower having means for feeding air through said filter, said blower including a rotatable blower rotor and an electric motor for driving said blower;
    an electronic control circuit having means for controlling the voltage effective across said motor;
    first means for providing a first signal dependent on the electric current of the motor; and
    second means for providing a second signal dependent on the rotational speed of the blower;
    said means for controlling being adapted to receive said first and second signals so as to control the power fed to the motor on the basis of the motor current and blower speed.

2. The gas mask of claim 1, wherein said means for controlling maintains the air feed rate constant by regulating the pulse-width ratio of the voltage effective across the motor.

3. The gas mask of claim 1, wherein the control circuit is of the analog type operable for converting the rotational speed frequency data to a voltage signal and for controlling the motor current on the basis thereof.

4. The gas mask of claim 1, wherein the means for measuring the rotational speed of the blower includes antenna plates and a conversion circuit having a phase-locked loop connected to said plates, said conversion circuit converting frequency deviations into pulses.

5. The gas mask of claim 1, further including electronic means for transferring parameter data to the electronic control circuit.

6. The gas mask of claim 1, further including a light-emitting diode connected to the electronic control circuit, said diode operable for indicating when the motor is not capable of producing a selected air feed rate.

7. The gas mask of claim 6, further including a battery and a guard circuit, said guard circuit operable for preventing deep discharge of the battery by cutting off power from the battery when the feed voltage falls below a set limit value.

8. The gas mask of claim 1, further including rotational speed pulse means for forming a rotational speed pulse depicting the rotation of the blower.

9. The gas mask of claim 8, wherein said rotational speed pulse means includes a capacitive transducer.

10. The gas mask of claim 9, wherein said blower further includes a blower blade and a blower box, said capacitive transducer includes a conductive strip positioned on the blower blade, said blower box having corresponding strips coupled as part of the oscillator circuit which is connected to the phase-locked loop functioning as a frequency deviation detector.

11. The gas mask of claim 10, wherein the capacitive transducer conductive strip on the blower blade is a sticker.

12. The gas mask of claim 10, wherein the capacitive transducer conductive strip on the blower blade is a printing.

13. The gas mask of claim 1, wherein the electronic circuit includes:

a switched-mode power source;

a pulse-width modulator operable for controlling said switched-mode power source;

a shunt operable for providing a signal dependent on the motor current; and capacitance electrodes positioned at the blower rotor and operable for producing a pulse signal in response to the blower rotor speed;

a microcontroller means for calculating, on the basis of the current and rotation speed of the blower, a set current value for the motor and a corresponding control signal to the switched-mode power source via the pulse-width modulator.

14. The gas mask of claim 13, further including a non-volatile read-only memory coupled to the microcontroller means, said read-only memory for retaining the rotational speed data for calibration purposes.

15. The gas mask of claim 13, wherein the microcontroller means monitors current values of the motor and selectively gives a warning of an approaching need for replacement of the electric motor.

16. The gas mask of claim 15, wherein the microcontroller means switches off the motor when the blower is defective.

* * * * *